Sept. 20, 1932.  J. C. LEUKHARDT, JR  1,878,867
RADIATOR WATER LEVEL INDICATOR
Filed Dec. 21, 1931
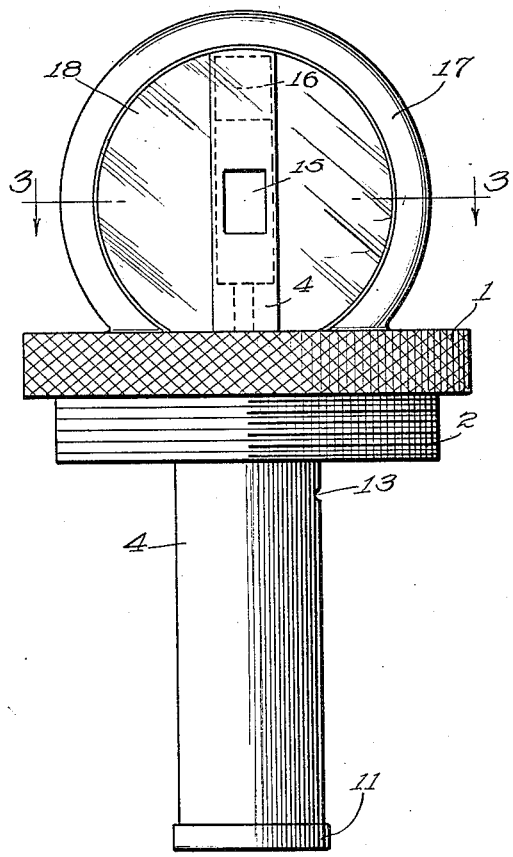
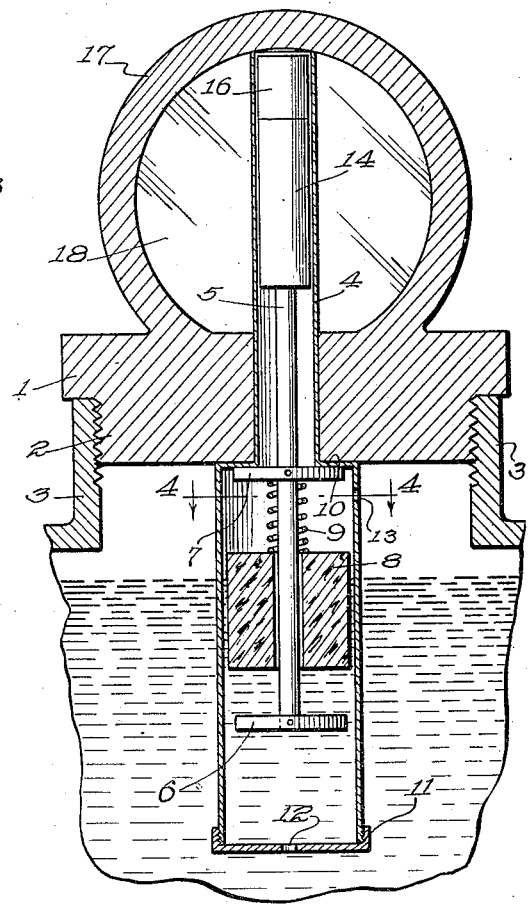
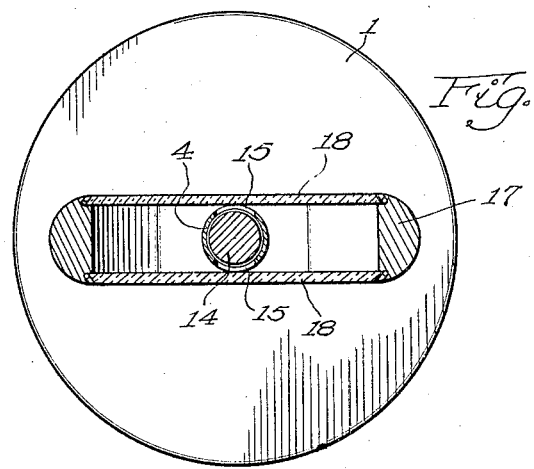
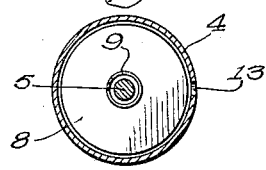
Inventor
John C. Leukhardt Jr.
Witness
Arthur M. Framke.

Patented Sept. 20, 1932

1,878,867

UNITED STATES PATENT OFFICE

JOHN C. LEUKHARDT, JR., OF WASHINGTON, DISTRICT OF COLUMBIA

RADIATOR WATER LEVEL INDICATOR

Application filed December 21, 1931. Serial No. 582,324.

This invention relates to improvements in liquid level indicators and particularly to low water level indicators for radiators as used in the cooling system of internal combustion engines.

The main objects of this invention are to provide an improved device to indicate a low or danger level of a liquid in a radiator; to provide a float type of indicator that will be to a considerable extent not affected by turbulence of the liquid; to provide an improved structure wherein the movement of the indicator is considerably less than the movement of the actuating float; to provide such a device wherein movement is imparted to the indicator only when the liquid level approaches the danger point; and to provide a device for automobile radiators that will visually indicate to a remotely positioned operator or attendant the necessity for renewing the liquid supply, thereby obviating the necessity of removing the radiator cap unless a further supply of liquid is necessary.

A specific embodiment of this invention is shown in the accompanying drawing wherein:

Figure 1 is a front elevation of the indicator as assembled on a radiator cap.

Fig. 2 is a sectional front elevation of the same as disposed on a radiator.

Fig. 3 is a sectional plan view of the same taken on line 3—3 of Fig. 1.

Fig. 4 is a sectional view taken on line 4—4 of Fig. 2.

In the form shown in the drawing, the low level indicator is mounted on a radiator cap having a top portion 1 and an externally threaded lower portion 2 adapted to be threaded into the nipple 3 of a radiator tank. The cap is provided with a central aperture through which is inserted a tubular shell or casing 4 of the indicator which extends above and below the cap, the portion extending below the cap being of sufficient length to project well into the liquid contained in the radiator tank.

Within the shell 4 an indicator plunger or rod 5 is disposed so as to be vertically movable. The rod 5 is provided with a fixed stop 6 at its lower end and a fixed stop 7 intermediate the ends of the rod. These stops may be either flat discs secured to the rod, or pins extending transversely through the rod. A float 8 is slidably disposed on the rod 5 between the stops 6 and 7 and serves the purpose of actuating the rod in its vertical movement.

A light coiled spring 9 is positioned on the rod 5 between the float 8 and the intermediate stop 7, and is arranged to normally urge the float 8 downwardly toward the stop 6, the spring 9 reacting against the stop 7.

The shell 4 extending through the cap is provided with a portion of the enlarged section which extends below the cap and into the liquid contained in the radiator, in order to accommodate a float of sufficient size to actuate the rod or plunger 5, and the shoulder 10, formed at the lower side of the cap, serves as a limit stop against which the fixed stop 7 can act to limit the upward movement of the rod 5. At the bottom end of the shell 4 is a closure 11 which serves as an abutment against which the stop 6 can act to limit the downward movement of the plunger rod 5.

The closure 11 is provided with an aperture 12 to admit the liquid into the shell 4 to actuate the float 8 and the rod 5. An aperture 13 is provided in the wall of the shell 4 adjacent the lower side of the cap to provide a vent above the float.

Within the portion of the shell 4 that extends above the cap there is an indicator 14 which is secured to the upper end of the rod 5 and shows, through the side apertures 15 of the upper portion of the shell 4, the relative vertical position of the rod 5. The upper portion 16 of the indicator 14 is preferably colored red to indicate danger, and the lower portion is preferably colored green to indicate a satisfactory condition.

The portion of the shell 4 extending above the cap may be housed in any suitable manner, and, as shown in the drawing, the housing comprises a circular casing 17 of sufficient width to accommodate the upper portion of the tube 4 and having glass faces 18 on each side to prevent weather from injuring the indicator 14.

In operation the liquid contained in the radiator, when at its normal full level, will urge the float 8 upwardly toward the radiator cap and against the action of the spring 9, thus holding the plunger rod 5 and the indicator 14 in a position to indicate a green signal through the side openings 15 of the upper portion of the shell 4. As the level of the liquid gradually recedes, the float will follow downwardly. However, the rod 5 and the indicator 14 will still be held in its upward position indicating a green signal because of the action of the spring 9 between the float and the intermediate fixed stop 7. When the liquid level has receded to a point where the float 8 rests against the stop 6, the spring will no longer keep the rod in its upper position, and the rod and indicator will follow the liquid level downward until a point is reached where the red or danger signal will be indicated through the opening 15.

The length of the lower portion of the shell 4 which extends into the liquid of the radiator, and the length of the rod 5 below the stop 7, are so proportioned that when the stop 6 on the plunger 5 rests against the closure cap 11, the red signal 16 will be positioned opposite the window 15.

In order to prevent fluctuation or bobbing of the indicator 14 due to turbulence of the liquid within the radiator, the aperture 12 is made relatively small so that the flow of liquid into and out of the shell 4 will be considerably retarded. Thus, when the liquid within the radiator is turbulent, such turbulence will not be imparted with its full effect to the surface of the liquid within the shell 4. The light spring 9 acting between the float 8 and the intermediate stop 7 further serves to compensate for movements of the float due to turbulence or vibration, and the indicator 14 will consequently provide a reliable indication of satisfactory or dangerous liquid level.

A further purpose for the slidable float 8 and the spring 9 lies in the fact that with such construction the vertical movement of the plunger rod 5 need be only a small portion of the total vertical movement of the float 8 and thus the portion of the shell 4 extending above the cap, and the housing 17 may be of practical and decorative proportions regardless of whether the upper water tank of the radiator be deep or shallow, since the only changes necessary to suit the indicator to liquid tanks of various depths is the change of the length of the rod 5 and the length of that portion of the shell 4 that extends below the cap. The total vertical movement of the rod 5 is determined by the relative distance between the stops 6 and 7 or the distance between stop 6 and the closure 11 when the indicator is in its uppermost position.

I have shown and described a type of liquid level indicator wherein the various signals are produced by vertical movement of the indicator 14. However, it is well within the scope of my invention to provide indicating means positioned in any manner on the radiator cap and wherein the indicator means is actuated by mechanical connection with that portion of the indicator which extends below the radiator cap.

The principal advantages of my invention lie in the fact that it is readily adaptable to automobile radiators wherein the level of the cooling liquid is most of the time turbulent and fluctuating, not only because of travel over rough roadways, but also because of the action of the circulating pump. It is a material advantage to have some external means of reliably indicating the level of the liquid within the radiator, not only to provide such information to the vehicle operator at all times, but also to obviate the unnecessary removal of the radiator cap by the operator or service station attendant and thus prevent the possibility of damage to the radiator cap or radiator shell by careless persons; and the danger of losing the radiator cap should it be loosely or carelessly replaced.

The main purpose of the indicator is to provide a low water warning, so arranged that only a glance is necessary to inform a person as to whether or not the radiator is in need of a further supply of liquid. If desired, the head 14 may be graduated or colored in any suitable fashion, so that when the vehicle is in motion, the mean level will be indicated to the driver, and when the vehicle is stopped, as at a service station, the actual level will be indicated to both the driver and the station attendant, but I prefer merely to have the red and green colored sections, indicating danger and safety.

Although but one specific embodiment of this invention has been herein shown and described, it will be understood that certain details of the construction shown may be altered or omitted without departing from the spirit of this invention as defined by the following claims.

I claim:

1. The combination of a radiator cap and a float actuated liquid level indicator, comprising a vertically movable indicator rod extending below said cap and into the radiator, a float adjacent the lower end of said rod and slidably mounted thereon, means to guide the vertical movement of said rod, resilient means acting between said float and rod to reduce the vertical movement of said rod relative to the vertical movement of the liquid surface within the radiator, and means at the top of said cap to visually indicate the relative vertical position of said rod.

2. A radiator liquid level indicator comprising a radiator cap, a tubular shell positioned to extend below said cap and into the radiator, a vertically movable indicator plunger arranged within said shell, means on said plunger to limit its upward and downward movement, a float on said plunger arranged to be vertically slidable relative thereto, resilient means normally urging said float toward the lower end of said plunger, a closure at the lower end of said shell, said shell having an aperture adjacent its lower end to admit liquid from the radiator, and means associated with said cap and actuated by said plunger to visually indicate the relative position of said plunger.

3. A liquid level indicator comprising a tubular shell adapted to extend into a liquid container, a vertically movable plunger arranged within said shell, a stop on said plunger intermediate its ends, another stop on the lower end of said plunger, a float slidably mounted on said plunger between said stops, a spring constantly urging said float toward the lower stop, and means on said shell engaging said stops respectively to limit the upward and downward movement of said plunger.

4. A liquid level indicator comprising a tubular shell adapted to extend into a liquid container, a vertically movable plunger arranged within said shell, a stop on said plunger intermediate its ends, another stop on the lower end of said plunger, a float slidably mounted on said plunger between said stops, a spring disposed between said intermediate stop and said float to normally urge said float toward the lower stop, and means on said shell engaging said stops respectively to limit the upward and downward movement of said plunger.

5. A liquid level indicator comprising a tubular shell adapted to extend into a liquid container, a vertically movable plunger arranged within said shell, a stop on said plunger intermediate its ends, another stop on the lower end of said plunger, a float slidably mounted on said plunger between said stops, a spring constantly urging said float toward the lower stop, a closure on the lower end of said shell, and means on said shell to limit the upward movement of said plunger, said shell having an aperture adjacent its lower end to admit liquid thereinto.

6. A liquid level indicator comprising a vertically positioned tube having a side opening adjacent its upper end, an indicator plunger arranged within said tube, a vertically movable plunger rod extending downwardly from said indicator plunger, a fixed stop at the lower end of said rod, a fixed intermediate stop arranged between said indicator plunger and the lower end of said rod, a float slidably mounted on said rod between said fixed stops, means normally urging said float toward the lower stop, means engaging said intermediate stop to limit the upward movement of said plunger rod, and means engaging the lower stop to limit the downward movement of said rod, said tube having an opening at its lower end to permit the ingress of liquid.

7. In a liquid level indicator comprising a float actuated vertically movable indicating plunger arranged in a tubular shell adapted to extend into a liquid container and project upwardly therefrom, a shoulder in said shell positioned intermediate its ends, a fixed stop on said plunger arranged to engage said shoulder and limit the upward movement of said plunger, a relatively slidable float mounted on said plunger below said fixed stop, another stop adjacent the lower end of said plunger to retain said float thereon and limit the downward movement of said plunger, a cap at the lower end of said shell to engage said other stop, and means normally urging said float toward the lower stop, said shell having a perforation at its lower end to admit liquid thereinto.

8. A liquid level indicator, comprising a vertically movable actuating rod extending into a liquid container, a float slidably mounted on said rod adjacent its lower end, means to guide the vertical movement of said rod, resilient means acting between said float and rod and normally urging said float toward the lower end of said rod, and means to limit the upward and downward movement of said rod.

Signed at Pittsburgh in the county of Allegheny and State of Pennsylvania this 17th day of Dec. 1931.

JOHN C. LEUKHARDT, Jr.